US00RE49972E

(19) United States
(12) Reissued Patent
Xu

(10) Patent Number: US RE49,972 E
(45) Date of Reissued Patent: May 21, 2024

(54) POULTRY GROWING ROBOT

(71) Applicant: Energy Americas, LLC, Boonville, MO (US)

(72) Inventor: Yunsheng Xu, Columbia, MO (US)

(73) Assignee: Energy Americas, LLC, Columbia, MO (US)

(21) Appl. No.: 18/117,223

(22) Filed: Mar. 3, 2023

Related U.S. Patent Documents

Reissue of:
(64) Patent No.: 11,259,498
Issued: Mar. 1, 2022
Appl. No.: 16/268,618
Filed: Feb. 6, 2019

(30) Foreign Application Priority Data

Feb. 7, 2018 (CN) ..... 201820223214.9

(51) Int. Cl.

| | |
|---|---|
| ***A01K 1/01*** | (2006.01) |
| ***A01C 3/04*** | (2006.01) |
| ***A01K 31/04*** | (2006.01) |
| ***B25J 11/00*** | (2006.01) |
| ***B60P 1/04*** | (2006.01) |
| ***B60P 1/43*** | (2006.01) |

(52) U.S. Cl.
CPC ..... *A01K 1/01* (2013.01); *A01C 3/04* (2013.01); *A01K 1/0128* (2013.01); *A01K 1/0146* (2013.01); *A01K 31/04* (2013.01); *B25J 11/0085* (2013.01); *B60P 1/04* (2013.01); *B60P 1/43* (2013.01)

(58) Field of Classification Search
CPC ..... A01K 1/01; A01K 1/0128; A01K 1/0146; A01K 31/04; A01C 3/04
See application file for complete search history.

(56) References Cited

U.S. PATENT DOCUMENTS

| | | | | |
|---|---|---|---|---|
| 3,680,166 | A * | 8/1972 | Dyreng | E01H 1/105 15/93.3 |
| 5,117,780 | A * | 6/1992 | Wooten | A01K 15/02 119/162 |
| 5,143,309 | A * | 9/1992 | Endom | A01B 33/021 241/101.763 |
| 5,189,836 | A * | 3/1993 | Alder | E04H 5/06 137/234.6 |
| 9,936,680 | B2 * | 4/2018 | Womble | A01K 15/02 |
| 10,238,084 | B2 * | 3/2019 | van Raam | A01K 1/0088 |

(Continued)

FOREIGN PATENT DOCUMENTS

EP 465811 * 1/1992

*Primary Examiner* — William E Dondero
(74) *Attorney, Agent, or Firm* — Sandberg Phoenix & von Gontard, PC.

(57) ABSTRACT

A poultry barn robot for robotically preforming various poultry barn operation tasks that includes a chassis, a collection platform pivotally mounted to the chassis, and an conveyor connected to the chassis, wherein the conveyor includes conveyor system for conveying at least one of dead birds and manure cakes from a bedded floor of a poultry barn to the collection platform. The robot additionally includes at least one equipment cabinet mounted to the chassis, and at least one controller that is structured and operable to control: movement of the robot through the poultry barn; movement of the conveyor system; and movement of the collection platform between a Collection position and a Disposal position.

23 Claims, 7 Drawing Sheets

(56) References Cited

U.S. PATENT DOCUMENTS

| | | | | |
|---|---|---|---|---|
| 10,870,958 | B2 * | 12/2020 | Fornarotto | E01H 1/006 |
| 11,019,805 | B2 * | 6/2021 | Hartung | G05D 1/0272 |
| 2002/0133899 | A1 * | 9/2002 | Van den Berg | A01K 1/01 15/319 |
| 2005/0217589 | A1 * | 10/2005 | Daniel | A01K 1/0029 119/51.02 |
| 2011/0185975 | A1 * | 8/2011 | Van Den Berg | A01K 15/029 119/57.92 |
| 2012/0291714 | A1 * | 11/2012 | Stal | A01K 1/0128 119/451 |
| 2013/0098306 | A1 * | 4/2013 | Loosveld | A01K 1/01 119/448 |
| 2015/0223429 | A1 * | 8/2015 | Van Adrichem | A01K 1/0135 414/528 |
| 2016/0316712 | A1 * | 11/2016 | Kratzer | C05F 3/00 |

* cited by examiner

POULTRY GROWING ROBOT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit, under 35 U.S.C. § 119, of Chinese Application CN201820223214.9, filed Feb. 7, 2018. The disclosure of the above application is incorporated herein by reference in its/their entirety.

FIELD

The present invention relates to poultry growing, and more specifically, to a robotic system for aiding in the operation of poultry barns.

BACKGROUND

The statements in this section merely provide background information related to the present disclosure and may not constitute prior art.

In the past decades poultry growing, also referred to herein as poultry farming, has evolved from family oriented small-scale natural growing to large scale industrial production. Poultry farming has become a specialized or full time job. There are several know problems that exist in the poultry farming industrial.

For example, poultry growing barn operations typically require long periods of high intensity labor. For instance, to manage 4-6 2000 square meter chicken growing barns, a grower needs to typically spend 4-6 hours each day inside of the barn. Grower's work generally consists of such things as patrolling the birds, observing the birds' growing status, adjusting the barn ventilation, adjusting temperature within the barn to adjust birds' growing environment, collecting dead and ill birds, examining the litter, and manually removing manure cakes. Picking up dead birds and removing manure cakes are both high intensity labors.

The environment inside a poultry growing barn presents a severe working environment with harmful air quality due to a poultry barn's large number and high density of birds (e.g., a typical poultry barn has 20,000-30,000 chicken or 15,000-20,000 turkeys). The air within most known poultry barns consists mainly of dust and ammonia, and therefore posts great threats to workers who work inside of the barns.

SUMMARY

Regarding the existing issues in poultry farming mentioned above, this practical new model offers a poultry barn robot (e.g., a poultry growing barn robot) to partially or completely replace manual operation in poultry farming.

In various embodiments, the present disclosure provides a poultry barn robot for robotically preforming various poultry barn operation tasks. The robot generally includes a chassis, a collection platform pivotally mounted to the chassis, and an conveyor connected to the chassis, wherein the conveyor is structured and operable for conveying at least one of dead birds and/or manure cakes from a bedded floor of a poultry barn to the collection platform. The robot additionally includes at least one equipment cabinet mounted to the chassis, and at least one controller that is structured and operable to control: movement of the robot through the poultry barn; movement of the conveyor; and movement of the collection platform between a Collection position and a Disposal position.

In various other embodiments, the present disclosure provides a method for preforming various poultry barn operation tasks. The method generally comprises robotically controlling the movement of a robot such that the robot traverses a bedded floor of a poultry barn, utilizing at least one controller of the robot disposed within at least one equipment cabinet of the robot. The method additionally comprises removing at least one of dead birds and/or manure cakes disposed on the bedded floor from the bedded floor utilizing an conveyor of the robot that is connected to a chassis of the robot, and conveying the at least one of dead birds and/or manure cakes removed from the bedded floor to a collection platform of the robot pivotally mounted to the chassis of the robot utilizing the conveyor, wherein movement of the conveyor is controlled by the at least one controller. The method further comprises removing the at least one of dead birds and/or manure cakes from the collection platform by moving the collection platform between a Collection position and a Disposal position, wherein the movement of the collection platform is controlled by the controller.

In still other various embodiments, the present disclosure provides a poultry barn robotic operation system, wherein the poultry barn robotic operation system comprises a poultry barn robot for robotically preforming various poultry barn operation tasks, and a waste management system for removing waste product collected by the robot. The robot generally includes a chassis, a collection platform pivotally mounted to the chassis, and an conveyor connected to the chassis, wherein the conveyor is structured and operable for conveying at least one of dead birds and/or manure cakes from a bedded floor of a poultry barn to the collection platform. The robot additionally includes at least one equipment cabinet mounted to the chassis, and at least one controller that is structured and operable to control: movement of the robot through the poultry barn; movement of the conveyor; and movement of the collection platform between a Collection position and a Disposal position. The waste management system generally comprises a bird and/or manure disposal pit structured and operable to receive the at least one of dead birds and/or manure cakes collected and disposed into the bird and/or manure disposal pit via the robot, and a waste removal system structured and operable to remove the at least one of dead birds and/or manure cakes disposed into the bird and/or manure disposal pit.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
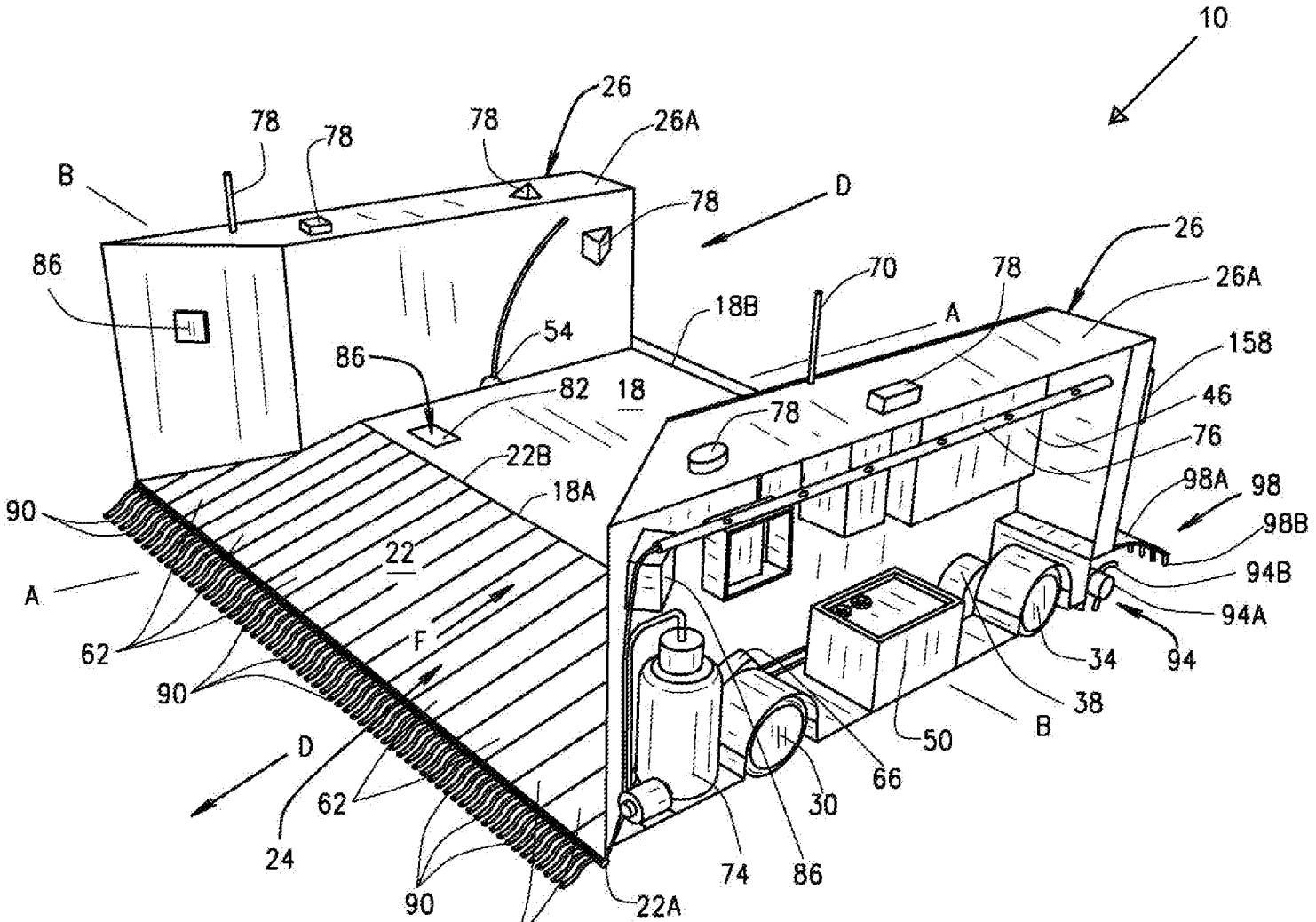
FIG. 1 is an isometric view of a poultry barn robot, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Figure 2:
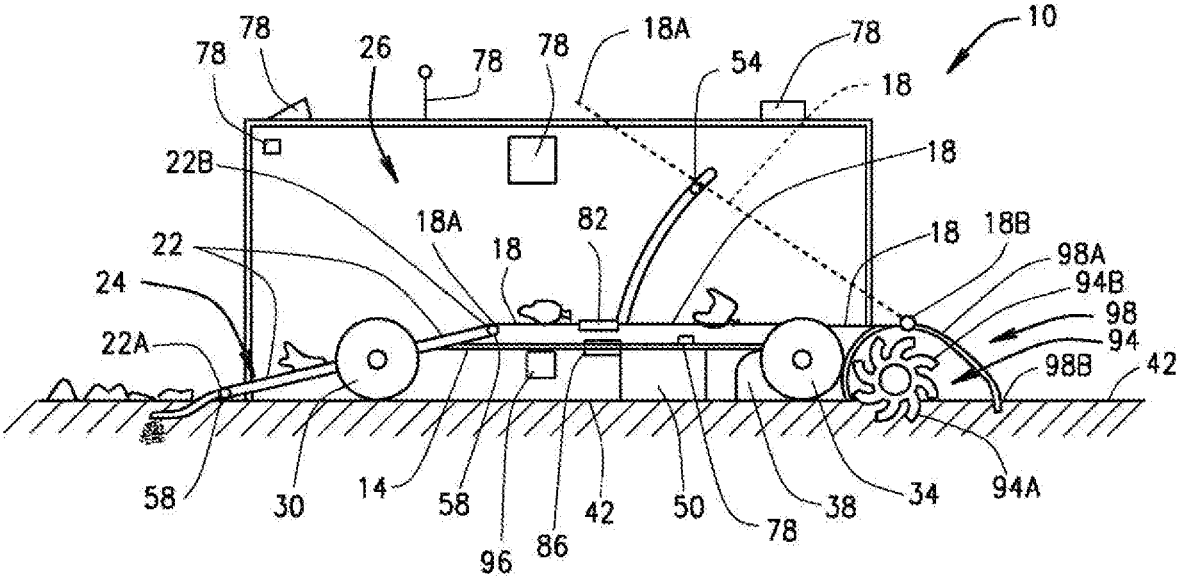
FIG. 2 is a cross-sectional side view of the poultry barn robot shown in FIG. 1 along line A-A, in accordance with various embodiments of the present disclosure.
Figure 3:
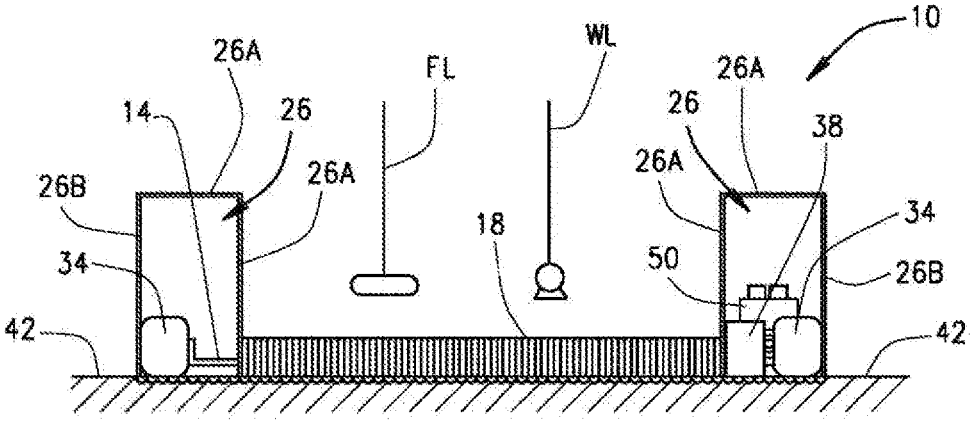
FIG. 3 is a cross-sectional view of the poultry barn robot shown in FIG. 1 along line B-B, in accordance with various embodiments of the present disclosure.

Referring now to FIGS. 1, 2 and 3, the present disclosure provides a poultry barn robot 10 (e.g., a poultry growing barn robot) that is structured and operable, as described below, to repetitiously traverse a poultry barn preforming various poultry barn operation tasks such as collecting ill and dead birds, processing manure, intelligently optimizing in-barn air quality, etc, thereby improving the environment for the birds within the barn, decreasing or eliminating the dependency on antibiotics to protect the welfare of the birds and ensure food safety. Additionally, the robot 10 can be structured and operable, as described below, to collect and process various barn environment and bird health data and automatically diagnose various barn environmental health issues and various health issues among the birds, and based on such on-site real-time diagnosis automatically adjust various barn environmental control systems; and/or automatically dispense and/or apply various environmental improvement agents and/or bird health treatments/medicines/disinfectants, thereby keeping the birds in a healthy condition to decrease the number of ill and dead birds. It is envisioned that the robot 10 of the present disclosure can at least partially, if not completely, replace manual labor in such barns, thereby preventing poultry barn operators from being exposed to the extreme, harsh and hazardous environment within such barns for long periods of time. The robot 10 is suitable for use in any poultry barn, for example, barns for chickens, turkeys, duck or any other poultry, as well as in various livestock barns.

The robot 10 generally includes a chassis 14, a collection platform 18 pivotally mounted to the chassis 14, a conveyor 22 connected to the chassis 14, at least one equipment cabinet 26 mounted to the chassis 14, one or more front wheel 30 rotationally mounted to the chassis 14, and one or more rear wheel 34 rotationally mounted to the chassis 14. FIG. 1 shows the robot 10 including two equipment cabinets 26 with one of the equipment cabinets 26 have a side panel removed to illustrate an interior of the respective equipment cabinet 26. Also, it is envisioned that in various embodiments the front and rear wheels can be replaced with rotatable robot propulsion tracks or treads (similar to tank tracks) and remain within the scope of the present disclosure.

The robot 10 additionally includes at least one computer based controller(s) 46 that is structured and operable to receive data input from various sensors, components and devices of the robot 10 as described below, and execute various collection, monitoring and/or control system software, programs, algorithms and/or codes to control the operation of the robot 10 as described herein. In various embodiments, the controller(s) 46 can execute artificial intelligence (AI) software, and/or communicate with a remote AI computer, to control the operation of the robot 10 and the poultry and environmental health diagnosis and treatment as described herein.

The robot 10 further includes at least one prime mover 38 (e.g., and electric motor or gas powered engine) that is/are operatively connected to at least one of the front and or rear wheels 30 and/or 34 and is/are structured and operable (as controlled by the controller(s) 46) to generate and controllably provide torque or power to the front and or rear wheel(s) 30 and/or 34, to thereby provide controllable motives force to the robot 10 such that the robot 10 can controllably traverse the bedded floor or ground 42 of a poultry barn (or of any other barn, stable, enclosure, housing, etc., where the robot 10 as described herein can be utilized). It should be understood that a bedding material is typically disposed on the physical floor or ground of a poultry barn. Therefore, when it is described herein that the robot 10 traverses the bedded floor or ground 42 of the poultry barn, it will be understood that the robot 10 can traverse, travel or move across both the bedding material and/or the physical floor or ground of the poultry barn depending on the depth and consistency of distribution of the bedding material. Although it is envisioned that the prime mover 38 can be any gas or electric powered prime mover (e.g., an internal combustion engine, a propane engine, hydraulic engine, pneumatic engine, or electric motor), the prime mover 38 will be exemplarily shown and described herein as an electric motor.

It is envisioned that in various embodiments, the robot 10 can further include a weighing system (e.g., sensors) that can be attached to the collection platform 18. In such instances the weighing system is structured and operable to determine/sense when a predetermined weight of birds and/or manure have collected on the collection platform 18, whereafter the robot 10 (as controlled by controller(s) 46) disposes of the collected birds and/or manure as described below. Still further, it is envisioned that in various embodiments the robot 10, more particularly, the controller(s) 46, can be structured and operable to acquire dead bird collection data, analyze such acquire data, and take/implement certain actions/operation of the robot 10 as described herein as a result thereof. For example, if the mortality is increased, the robot/controller(s) 10/46 will be automatically programed to traverse the bedded floor 42 (as described herein) more frequently, for example, if the robot 10 is programed to traverse the entire bedded floor is twice a day, the controller 42 can then increase traversal of the bedded floor 42 to three or four times a day.

Further yet, the robot 10 includes a battery bank 50 comprising one or more battery (e.g., rechargeable battery(ies)) that is utilized to provide electrical energy to various systems, devices, sensors, etc., of the robot 10, such as the controller(s) 46, the prime mover 38, various environmental sensors 78 of the robot 10, various data collection and imaging devices 86 (e.g., thermometer(s), barometer(s), hygrometer(s), illumination sensor(s), gas concentration sensors (e.g., ammonia, carbon dioxide, carbon oxide, etc., sensors), IR and/or CCD and/or thermal camera(s), a microphone or other sound sensor/recorder, etc.) of the robot 10, etc.

As illustrated in the figures, the collection platform 18 is pivotally connected to the chassis 14 along a trailing edge 18B of the collection platform 18. Additionally, the collection platform 18 is connected to a lift mechanism 54 disposed within the equipment cabinet(s) 26 and structured and operable to controllably raise a leading edge 18A of the collection platform 18 to thereby controllably move the collection platform 18 between a Collection position (illustrated by the solid line in FIG. 2) and a Disposal position (illustrated by the dashed line in FIG. 2). When in the Collection position the collection platform 18 is disposed in a generally horizontal orientation, and when Disposal position the collection platform 18 is oriented, via the lift mechanism 54, to an angle sufficient to cause any poultry, manure cakes, and any other items disposed on the collection platform 18 to slide off the collection platform 18 and be disposed of as described below. For example, in various embodiments, the lift mechanism can controllably raise and lower the collection platform 18 to any angle between 0° (when the collection platform 18 is in the Collection position) and 90° (relative to the Collection position). When in the Collection position, the collection platform 18 is mounted to the chassis 14 to position the collection platform 18 a certain clearance distance above the bedded floor 42 such that there is a desired amount of clearance between the bedded floor 42 and the bottom of the collection platform 18. For example, in various embodiments, when in the Collection position, the collection platform 18 is disposed approximately 1-18 inches above the bedded floor 42.

As also illustrated in the Figures, in various embodiments, the conveyor 22 is mounted to the chassis 14 such that a leading edge 22A is positioned or disposed near or in contact with the bedded floor 42 and a trailing edge 22B is positioned or disposed in close proximity to the collection platform leading edge 18A. Although the conveyor 22 is exemplarily illustrated in the figures as being inclined from the leading edge 22A to the trailing edge 22B, in is envisioned that in various embodiments, the conveyor can have little or no incline from leading edge 22A to trailing edge 22B such that the collection platform 18 and the conveyor 22 are both oriented close to the bedded ground 42 and substantially in the same plane. Moreover, in various embodiments, the conveyor 22 comprises a conveyor frame 58 that is pivotally mounted to the chassis 14 so that the conveyor leading edge 22A can be adjustable set to a desired height such that the conveyor leading edge 22A can be positioned or disposed near or in contact with the bedded floor 42. Additionally, in various instances, the conveyor frame 58 can be pivotally mounted to the chassis 14 such that the leading edge can automated raise and lower in accordance with the contour of the bedded floor 42 as the robot traverses the bedded floor 42.

Figure 9:
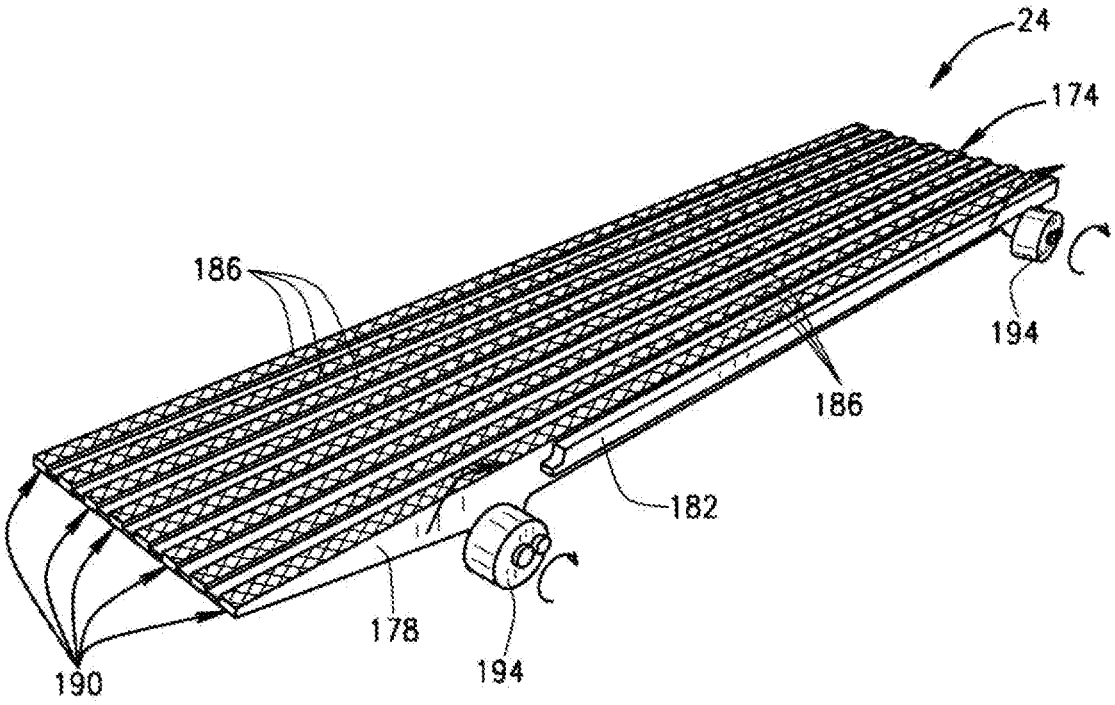
FIG. 9 is an exemplary illustration of a conveyor system of the poultry barn robot shown in FIG. 1, in accordance with various embodiments of the present disclosure.

The conveyor 22 comprises a conveyor system 24 that is structured and operable to selectably and controllably convey birds and/or manure cakes from the leading edge of the conveyor 22A to the trailing edge of the conveyor 22B. In various embodiments, the conveyor system 24 can comprise one or more conveyor belt or strap 62 (e.g., one or more rubber, plastic, polyurethane or other composite material, wire mesh or link, or any other suitable material or construction belt or strap) that is/are rotationally mounted around the conveyor frame 58, and a belt drive motor 66 that is structured and operable (as controlled by the controller(s) 46) to selectably and controllably rotate the conveyor belt(s) 62. The conveyor 22 can comprise any conveyor system 24 suitable to convey birds and/or manure cakes from the leading edge of the conveyor 22A to the trailing edge of the conveyor 22B. For example, in various embodiments, the conveyor system 24 can comprise the conveyor belt(s) or strap(s) 62 described above. Or, alternatively, as exemplarily illustrated in FIG. 9, in various embodiments, the conveyor system 24 can comprises a eccentrically reciprocating table and grid system 174 comprising an eccentrically rotating table 178 and a fixed grid 182. The eccentrically rotating table 178 comprises a plurality of raised conveyor bars 186 and one or more fixed grid 190. The raised conveyor bars 186 are sized and shaped to fit between slots 190 in the fixed grid 182, or between the fixed grids 182. The raised conveyor bars 186 are structured and operable to selectably and controllably convey birds and/or manure cakes from the leading edge of the conveyor 22A to the trailing edge of the conveyor 22B. Generally, the fixed grid(s) 182 is/are mounted to the chassis 14 and the eccentrically rotating table 178 is connected to eccentric wheels 194, wherein rotation of the eccentric wheel 194 (provided by one or more motor (not shown) to which the eccentric wheels are operatively connected) causes the raised conveyor bars 186 to rise above the level of fixed grid(s) 182, and move forward (e.g., move in the direction from the leading edge 22A to the trailing edge 22B of the conveyor 22) for a certain distance before the raised conveyor bars 186 move down below the fixed grid(s) 182. Continuous rotation of the eccentric wheels 194 then causes the objects (e.g., dead birds and/or manure cakes) on the raised conveyor bars 186 to be conveyed to the collection platform 18.

For simplicity, the conveyor 22 will be exemplarily described herein as comprising the conveyor belt(s) or strap(s) 62. In such embodiments, the belt drive motor 66 can selectably and controllably rotate the conveyor belt(s) 62 (as controlled by the controller(s) 46) such that a top surface 22C of the conveyor 22 can be moved in a forward direction from the conveyor leading edge 22A to the conveyor trailing edge 22B, and can be reversed to move the top surface 22C from the conveyor trailing edge 22B to the conveyor leading edge 22A. In various embodiments, the conveyor drive motor 66 can be an electric motor powered by the battery bank 50. The conveyor belt(s) or strap(s) 62 can be fabricated of any suitable material such at rubber, metal, fabric, etc. In various embodiments, wherein the conveyor 22 comprises a plurality of conveyor belts or straps 62, the belts or straps 62 can be spaced apart to provide a gap between adjacent belts or straps 62. Such a gap can have any desired width, for example, the gap can be 2 mm to 20 mm wide. The gaps allow bedding material that may be scooped up along with the dead birds and/or manure cakes to fall back onto the bedded floor 42 through the gaps, such that only dead birds, ill birds, and big pieces of manure cake are conveyed to the collection platform 18. In various embodiments, wherein the conveyor 22 comprises a single conveyor belt 62, the conveyor belt can comprise a wire mesh or a plurality of perforations, slots, holes, orifices or apertures arrayed throughout the belt 62. The perforations allow bedding material that may be scooped up along with the dead birds and/or manure cakes to fall back on to the bedded floor 42 through the perforations, such that only dead birds, ill birds, and big pieces of manure cake are conveyed to the collection platform 18.

The at least one equipment cabinet 26 is structured and operable to house and enclose various systems, subsystems, components, mechanisms and apparatus of the robot 10, such as the prime mover 38, and/or the controller(s) 46, and/or the battery bank 50, and/or the conveyor belt drive motor 66. In various embodiments, the equipment cabinet(s) 26 is/are structured and operable to house and enclose other systems, subsystems, components, mechanisms and apparatus, such as: at least a portion of one or more communication module 70 (e.g., a wireless network (WiFi), a blue tooth module, a radio frequency antenna, a microwave antenna, an electromagnetic frequency antenna a GPS receiver) communicatively (wired and/or wirelessly) connected to the controller(s) 46; one or more liquid and/or gas and/or powder storage tank(s) 74 for storing such things poultry medicines/treatments/disinfectants, environmental conditioning treatments (e.g., water/steam, oxygen, etc.); at least a portion of one or more sprayer or treatment distribution system 76 for spraying and/or distributing the poultry medicines/treatments/disinfectants and/or environmental conditioning treatments (as controlled by the controller(s) 46); at least a portion of one or more poultry health and/or environmental condition sensor 78 (e.g., thermometer(s), barometer(s), hygrometer(s), gas concentration sensors (e.g., ammonia, carbon dioxide, carbon oxide sensors), a microphone or other sound sensor/recorder etc.), that are communicatively (wired and/or wirelessly) connected to the controller(s) 46; at least a portion of one or more data collection and/or imaging devices 86 (e.g., illumination (light) sensor, IR and/or CCD and/or thermal cameras, etc.) that is/are communicatively (wired and/or wirelessly) connected to the controller(s) 46; and/or one or more speaker communicatively (wired and/or wirelessly) connected to the controller(s) 46 for projecting sounds conducive to the and/or health of the respective poultry. In various instances, the speaker(s) can be utilized to emit an alarm /warning sound indicative of any adverse environmental or poultry condition that the controller(s) 46 (via data input from the various sensors 78 and/or imaging devices 86) detects is present or exists, or is about to occur. In such instances, in addition to, or in the alternative of, the speaker emitting alarm/warning sounds, the robot 10 can additionally include one or more alarm/warning light that will illuminate to indicate any adverse environmental or poultry condition that the controller(s) 46 (via data input from the various sensors 78 and/or imaging devices 86) detects is present or exists, or is about to occur.

The equipment cabinet(s) 26 generally comprises shell 26A and an access panel 26B that connects to the shell 26A to provide the enclosure. In various embodiments, the shell 26A and/or access panel 26B can include a perimeter seal (e.g., gasket) that provides a substantially airtight seal when the access panel 26B is connected to the shell 26A, thereby providing a substantially airtight enclosure for the systems, subsystems, components, mechanisms and apparatus (as described herein) disposed within the equipment cabinet(s) 26 that is free from the debris and dust and contaminates that are present within the respective poultry barn.

Generally, in operation, the robot 10, the controller(s) 46 controls operation of the prime mover 38 to provide motive power to one or more of the front and/or rear wheels 30 and 34, thereby causing the robot 10 to move along the bedded floor 42 in the direction D. The controller(s) 46 further controls operation of the prime mover 38 and one or more of the front and/or rear wheels 30 and 34 to steer the robot 10 such that the robot 10 systematically and repetitiously traverses the bedded floor 42 of the respective poultry barn. For example, the controller(s) 46 controls operation of the robot 10 such that the robot systematically and repetitiously traverses substantially the entire area of the bedded floor 42. Then the robot 10, as controlled by the controller(s) 46, moves in a pattern or path such that the robot 10 will systematically traverse substantially the entire area of bedded floor 42. For example, the robot 10 will move back and forth across the entire length and/or width of the bedded floor in overlapping substantially straight paths or swaths such that the robot 10 will systematically traverse substantially the entire area of bedded floor 42. In various embodiments, at least two of the wheels 30 and/or 34 can be independently driven via a second prime mover 38 such that the robot 10 can have a 360° turning radius.

Figure 8A:
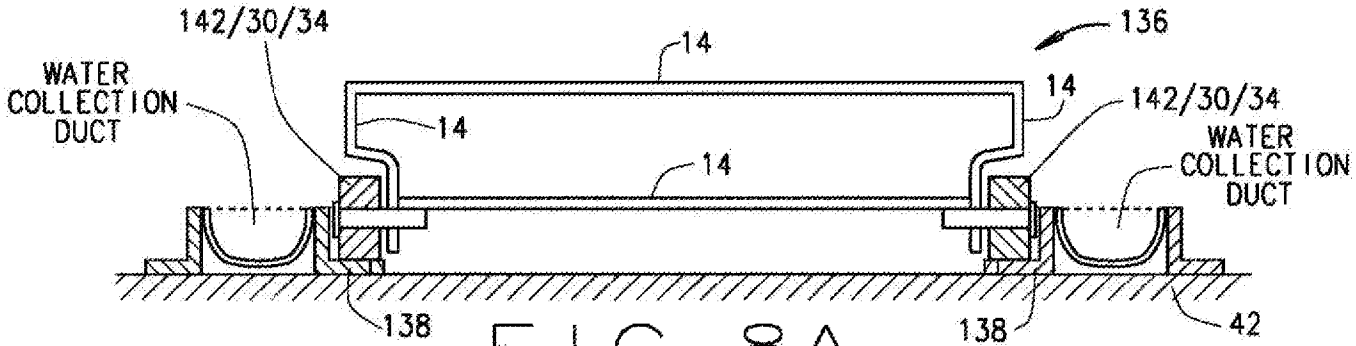
FIGS. 8A, 8B and 8C are exemplary schematic figures illustrating a guide track system for the robot shown in FIG. 1, in accordance with various embodiments of the present disclosure.
Figure 8B:
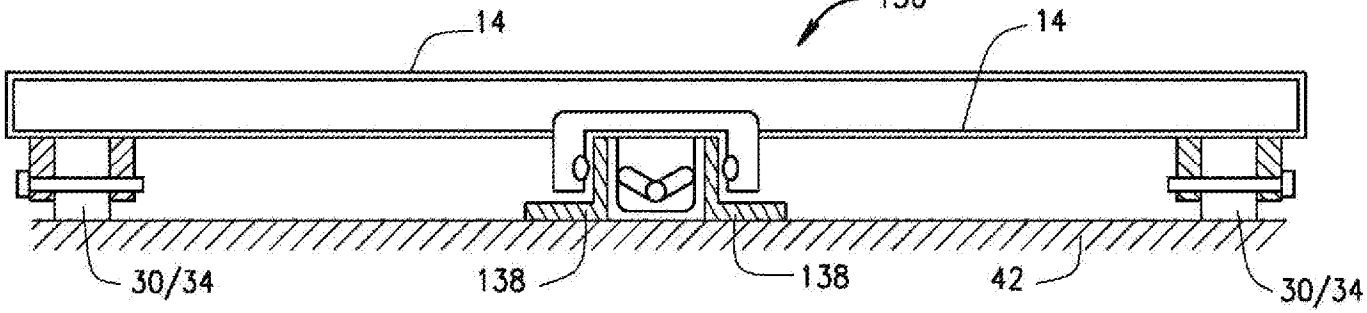
Figure 8C:
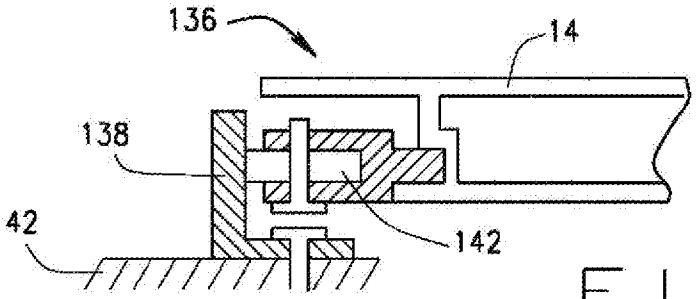

Alternatively, as exemplarily illustrated in FIGS. 8A, 8B and 8C, the movement of the robot 10 can be controlled by a robot guidance system 136 disposed on the barn floor. Particularly, the robot guidance system 136 comprises one or more guide rails or tracks 138 that are disposed on the barn floor within the bedding material and guide, steer or otherwise control the path along which the robot traverse the bedded floor 42. In various embodiments, the controller(s) 46 can control operation of the prime mover 38 to control the speed and direction (e.g., forward or backward) of movement of the robot 10, and the robot 10 is guided by the guide tracks 138 to systematically traverse substantially the entire area of bedded floor 42. The guide tracks 138 can be any physical guidance system (e.g., a rail or track based system) that is structured and operable to guide the movement of the robot 10 within barn. For example, in various embodiments, the guide tracks 138 can comprise tracks or rails that are disposed/mounted on/to the barn floor and/or walls in addition to the water collection ducts, feed chains and other poultry barn infrastructure that is disposed on barn floor. Alternatively, in various implementations, a portion of the poultry barn infrastructure, such as the water collection ducts and/or the feed chains can be utilized as the guide tracks 138. In various embodiments, the robot 10 can include robot guide wheels or other guides 142, that contact, engage or otherwise interact with guide tracks 138 disposed on the barn floor to control the movement of the robot 10.

Additionally, in various embodiments, the movement of the robot 10 can be controlled by a navigation system that includes magnetic, and/or infrared, and/or laser sensors and receivers strategically located a multiple locations within the barn (e.g., all four corners) and on the robot 10, that, as controlled by the controller(s) 46, communicate with each other to provide robot location data that is utilized by the controller(s) 46 to control the movement of the robot 10 within the barn. Additionally, in various embodiments, the movement of the robot 10 can be controlled by a navigation system that one or more GPS sensor and receiver strategically located a multiple locations within the barn (e.g., all four corners) and on the robot 10, that, as controlled by the controller(s) 46, communicate with each other to provide robot location data that is utilized by the controller(s) 46 to control the movement of the robot 10 within the barn.

It is envisioned that the robot 10 can be constructed to have any desirable dimensions, such that the robot can be custom made to be used in generally any sized poultry barn. For example, in various embodiments that robot 10 can be approximately 6 feet wide, 6 feet long and 4 feet tall, or in other embodiments the robot 10 can be approximately 12 feet wide, 6 feet long and 4 feet tall. Or, in other embodiments, the robot 10 can have width that is approximately equal to ¼, ½, or the entire width of the respective bedded floor of the barn in which the robot 10 is to be utilized. In such instances, the robot 10 would only need to make a single pass to traverse substantially the entire area of bedded floor 42.

As the robot moves across the bedded floor 42 in the direction D the controller commands rotation of the conveyor 22 (e.g., the conveyor belt(s) and/or strap(s)) in the forward direction (indicated by an arrow F in FIG. 1) and the live birds will either move out of the path of the robot 10 or climb onto the moving conveyor 22 and/or the collection platform 18 and will eventually jump off. However, dead or sick birds will not move, in which case the leading edge 22A of the conveyor 22 will push under the respective dead or sick birds, thereby scooping up the dead or sick birds whereafter the respective birds are conveyed up the conveyor 22 and pushed onto the collection platform 18. Similarly manure cakes will be scooped up and removed from the bedded floor 42 and transported to the collection platform 18. Once the robot has traversed substantially the entire area of the bedded floor, the dead and/or sick birds and/or manure cakes are removed from the collection platform 18 and disposed of, or examined, or otherwise analyzed. In various embodiments, (as described below and exemplarily illustrated in FIG. 6) the respective barn, or surrounding environment, can include a disposal pit for receiving the dead birds and/or manure cakes. In such instances, once the robot 10 has traversed substantially the entire surface area of the bedded floor 42, the robot 10 (as controlled by the controller(s) 46) can be backed up the disposal pit, whereafter the controller(s) 46 will raise the collection platform 18, via the lift mechanism 54, to the Disposal position, thereby causing the dead birds and/or manure cakes to slide off the collection platform 18 and fail into the disposal pit.

In various embodiments, the robot 10 can further comprise a plurality of sifting tines 90 extend from the leading edge 22A of the conveyor 22. When the robot 10 is in operation, the sifting tines 90 extend downward into the bedding on the bedded floor 42 and sift through the bedding material assisting in the scooping up of the dead/sick birds and/or manure cakes such that the dead/sick birds and/or manure cakes can be conveyed, via the conveyor 22, to the collection platform 18, as described above. Particularly, the shifting tines 90 are structured and operable to scoop the bedding material on the bedded floor 42 and/or to till or scarify) the bedded floor 42. In various embodiments, the robot 10 and tines 90 can be adjustable such that the depth in which the tines 90 extending into or penetrate the bedding on the bedded floor 42 can be adjusted (manually or automatically) as need to fit the floor condition and/or accommodate the particular age of the birds.

Additionally, in various embodiments, the robot 10 can comprise a bedding tiller 94 mounted to the rear of the chassis 14. The bedding tiller 94 generally comprises a cylindrical body having a plurality of tilling blades extending radially outward therefrom. The cylindrical body 94A is operatively connect to rotation motive source (e.g., an independent tiller motor (not shown), or a set of gears (not shown) that operatively connect the tiller 94 to one or more of the rear wheels 34) that is structured and operable to rotate the tiller 94 along a longitudinal axis of the cylindrical body 94A such that the tiller blades 94B dig into the bedding on the bedded floor 42 and till, turn, and/or aerate the bedding that can become compacted over time.

Furthermore, in various embodiments, the robot 10 can comprise a smoothing harrow 98 extending from and pivotally connected to the rear of the chassis 14, and in the instances wherein the robot 10 comprises the tiller 14, beyond the tiller 94. The smoothing harrow 98 generally comprises a base plate 98A that is pivotally connected to the rear of the chassis 14 and a plurality of teeth or fingers 98B extending from the base plate 98A. In operation, the base plate 98A is pivotally connected to the chassis 14 such that the teeth 98B will be pushed, via gravitational forces, into the bedding material such that as the robot traverse the bedded floor 42 the teeth 98B will groom or rake the bedding material to substantially smooth out or level out the bedding material. In various instances, the smoothing harrow 98 can include an adjustable stop (not shown) to control how deep the harrow teeth 98B penetrate the bedding material. Also, in various instances, the smoothing harrow 98 can be pivoted about its pivotal connection to the chassis 14 to a stowed position wherein the teeth 98B are raise out of the bedding material and will not contact the bedding material as the robot 10 traverses the bedded floor 42.

Still further, in various embodiments, the robot 10 can comprises a bedding dryer device or system 96 that is communicatively connected (wired and/or wirelessly) to the controller(s) 46. The bedding dryer system 96 is structured and operable to dry the bedding material, as the robot 10 traverses the bedded floor 42, based on data collected by the poultry health and/or environmental condition sensor(s) 78, and/or the imaging device(s) 86. The bedding dryer system 96 can comprise any components/device suitable for drying and removing moisture from the bedding material as the robot 10 traverses the bedded floor 42, such as at least one heating device structured and operable to generate heat, at least one blower device structured and operable to blow the generated heat on the bedding material, and/or at least one dehumidifier device structured and operable to remover moisture from the bedding material.

As described above, in various embodiments, the robot 10 can includes one or more data collection and/or imaging devices 86 (e.g., IR and/or CCD and/or thermal cameras, etc.) that is/are communicatively (wired and/or wirelessly) connected to the controller(s) 46 and at least partially disposed within the equipment cabinet(s) 26. The data collection and/or imaging devices 86 can be mounted or located at any desired location on the robot 19, (e.g., the front, and/or the back, and/or the sides, and/or the top, and/or the bottom/underside of any part of the robot 10. For example, in various instances, the imaging device(s) 86 can be visible light and/or infrared (IR) thermal camera(s) located beneath one or more window 82 disposed within the collection platform 18. In such instances, the imaging device(s) 86 is/are oriented to have an upward field of view through the respective window 82 such that image data of anything (e.g., a bird) standing or lying on the window can be collected. In such instances, the imaging device(s) 86 can be utilized to capture birds' activity, manure's color and shape, bird's body temperature, and other relevant information and data.

For example, in various embodiments, image data of the bottom of the feet to live birds can be obtained and analyzed by the controller(s) 46 to obtain various health data of birds. More particularly, in various implementations, the upward oriented imaging device(s) is/can be used to capture and analyze (via, the controller(s) 46) birds' feet health condition, such as infection level, from the shape, temperature, images of the birds' feet. Alternatively, various other implementations, such upward facing imaging device(s) 86 can be located elsewhere, independently, and remotely from the robot 10 and communicate (wired and/or wirelessly) with the robot controller(s) 46. In various other embodiments, the IR (infrared) camera(s) 14 can be disposed at the relatively high location on the robot 10 (e.g., on top of the equipment cabinet(s)) such that the IR camera(s) can collect IR image data of a plurality of birds upon each image capture. For example, in various instances, the IR camera(s) can measure the environment temperature, and generate (via, the controller(s) 46) temperature profile(s) in various areas of the barn as a color picture, wherein the temperature profile(s) can illustrate the body temperature of the birds including chest, eyes, and feet.

The imaging devices 86 are communicatively connected (wired and/or wirelessly) with the controller(s) 46 whereby the controller(s) 46 bi-directionally communicates with the imaging devices 86 to output commands to the imaging devices 86 and receive data input the imaging devices 86. For example, the controller(s) 46 receives image data input from the imaging devices 86 and executes various collection, monitoring and/or control system software, programs, algorithms and/or codes that utilize the image data input to analyze various poultry and environmental health and climate conditions. The controller(s) 46 then outputs commands based on the analysis to control the operation of the robot 10 and/or the various systems, subsystems, components, mechanisms and apparatus of the robot 10 (e.g., to control application of the various poultry and/or environmental medicines and/or treatments sprayed/distributed by the spraying system 76), in order to maintain in-barn air quality, bedded floor condition and/or poultry health. It is envisioned that in various embodiments, the collected image date can be utilized to monitor bird location within the barn, various bird activities, abnormal behavior of the one or more birds, the status and condition of the bird feeding and watering systems and devices, etc.

Additionally, in various embodiments, the robot 10, via the controller(s) 46, can (wired and/or wirelessly) communicate with barn systems remote from the robot 10 (e.g., not included in/on the robot 10) to control and intelligently adjust the barn's heating/cooling/climate control system, the barn's ventilation system, and various other remote devices, apparatus and systems, based on the input image data collected and analyzed by the robot controller(s) 46.

As described above, the various systems, subsystems, components, mechanisms and apparatus disposed at various locations within the equipment cabinet(s) 26 can comprise one or more poultry health and/or environmental condition sensor 78 communicatively (wired and/or wirelessly) connected to the controller(s) 46. In various instances, the poultry health and/or environmental condition sensor(s) 78 can comprise temperature sensor(s) (e.g., thermometers)), humidity sensor(s) (e.g., hygrometer(s)), carbon dioxide CO2 sensor(s), illumination sensor(s), ammonia (NH3) sensor(s), and other desired sensors structured and operable for extracting valuable information regarding the environmental conditions within the barn and the health condition of poultry. In various instances, the sensors 78, e.g., the temperature(s) and/or hygrometer(s) (humidity sensor(s)) 78, can be placed beneath the collection platform 18 to monitor the condition of the bedding material, and/or in various other instances the temperature(s) and/or hygrometer(s) (humidity sensor(s)) 78 can be located on the top of sides of the equipment cabinet(s) 26 to monitor the condition surrounding environment/air. The sensors 78 are communicatively connected (wired and/or wirelessly) with the controller(s) 46 whereby the controller(s) 46 bi-directionally communicates with the sensors 78 to output commands to the sensors 78 and receive data input the sensors 78. For example, the controller(s) 46 receives data input from the sensors 78 and executes various collection, monitoring and/or control system software, programs, algorithms and/or codes that utilize the data input to analyze various poultry and environmental health and climate conditions and then outputs commands based on the analysis to control the operation of the robot 10 and/or the various systems, subsystems, components, mechanisms and apparatus of the robot 10 (e.g., to control application of the various poultry and/or environmental medicines and/or treatments sprayed/distributed by the spraying system 76), in order to maintain in-barn air quality, bedded floor condition and/or poultry health. For example, in various instances, the sprayer system 76 can include a motor, and/or a compressor/pump, and/or a blower, and/or a pipe line with diffusers (holes) or nozzles that are structured and operable to disperse, disseminate, distribute and/or apply the various poultry and/or environmental medicines and/or treatments, which can be in liquid, gas, powder, and/or granular form. Additionally, in various embodiments, the robot 10, via the controller(s) 46, can (wired and/or wirelessly) communicate with barn systems remote from the robot 10 (e.g., not included in/on the robot 10) to control and intelligently adjust the barn's heating/cooling/climate control system, the barn's ventilation system, and various other remote devices, apparatus and systems, based on the input data collected and analyzed by the robot controller(s) 46.

In various embodiments, the robot 10 and controller(s) 46 are structured and operable to collect data (e.g., sensor 78 data and/or imaging device 86 data) in real time as the robot 10 traverses the bedded floor 42, as described herein. In various embodiments, the robot 10 and controller(s) 46 are further structured and operable to collect data (e.g., sensor 78 data and/or imaging device 86 data) with robot 10 is idle (i.e., not moving) anywhere within the barn.

As exemplarily illustrated in the figures, the robot 10 is constructed such that the conveyor 22 and collection platform 18 are disposed at a height that is lower than the top of the equipment cabinet(s) 26 so that travel path of the robot 10 can be controlled such that the robot 10 avoids and does not interfere with, contact, disturb or damage the infrastructure, equipment, and systems of the poultry barn. For example, having the conveyor 22 and collection platform 18 disposed at a height that is lower than the top of the equipment cabinet(s) 26 allows for the robot 10 traverse the bedded floor 42 without interfering with, contacting, disturbing or damaging poultry feed line(s) FL, water line(s) WL, and other barn infrastructure, equipment, and systems such as heater(s), tunnel fan(s). Alternatively, the robot 10 can be constructed to have generally any height or profile. That is, in various embodiments, the robot 10 can be a low profile robot wherein height of the equipment cabinet(s) 26 is near, equal to, or less than the height of the collection platform 18, or any other desired height such that the equipment cabinet(s) 26 can pass under the water lines WL and feed lines FL and other barn infrastructure, equipment, and systems such as heater(s), tunnel fan(s) within the respective barn.

Figure 4:
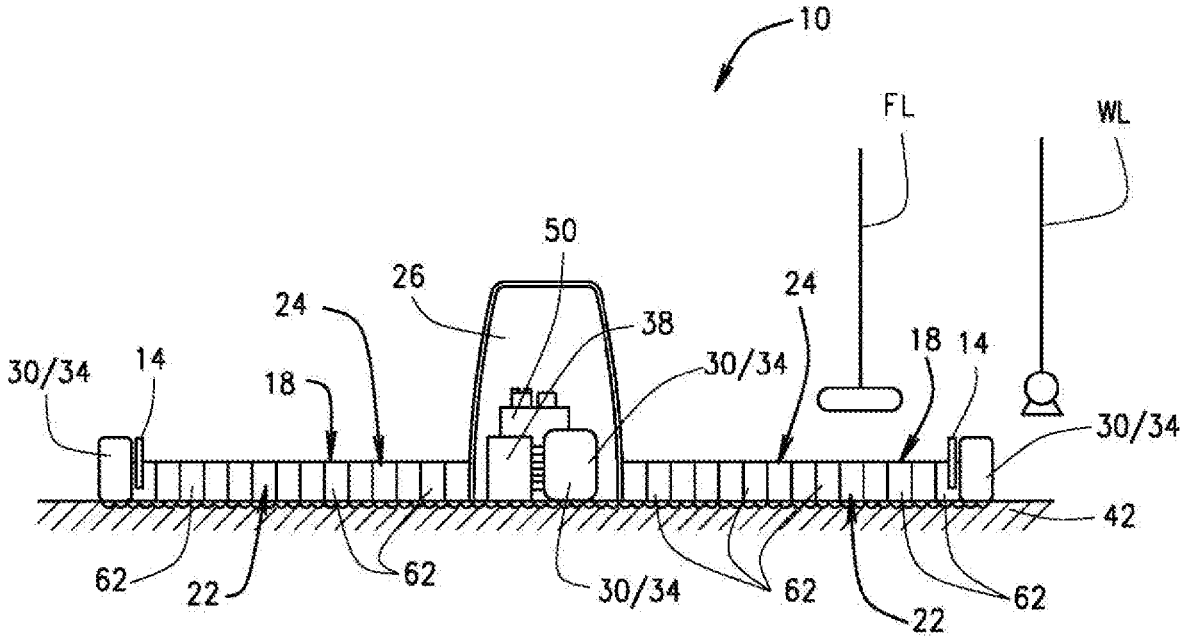
FIG. 4 is a front view of the robot shown in FIG. 1, illustrating an alternative layout of the wheels and equipment cabinet, in accordance with various embodiments of the present disclosure.

Referring now to FIG. 4, as described above, the robot 10 can comprise one or more equipment cabinet 26. For example, as exemplarily illustrated in FIG. 4, in various embodiments the robot 10 can comprise a single equipment cabinet 26 with two collection platforms 18 and two conveyors 22 disposed on opposing sides of the equipment cabinet 26. In such embodiments, the robot 10 can comprise one or two sets of sifting tines 90 extending from the conveyors 22, and/or one or two bedding tillers 94 and/or smoothing harrows 98 disposed on the rear of the robot 10.

Figure 5:
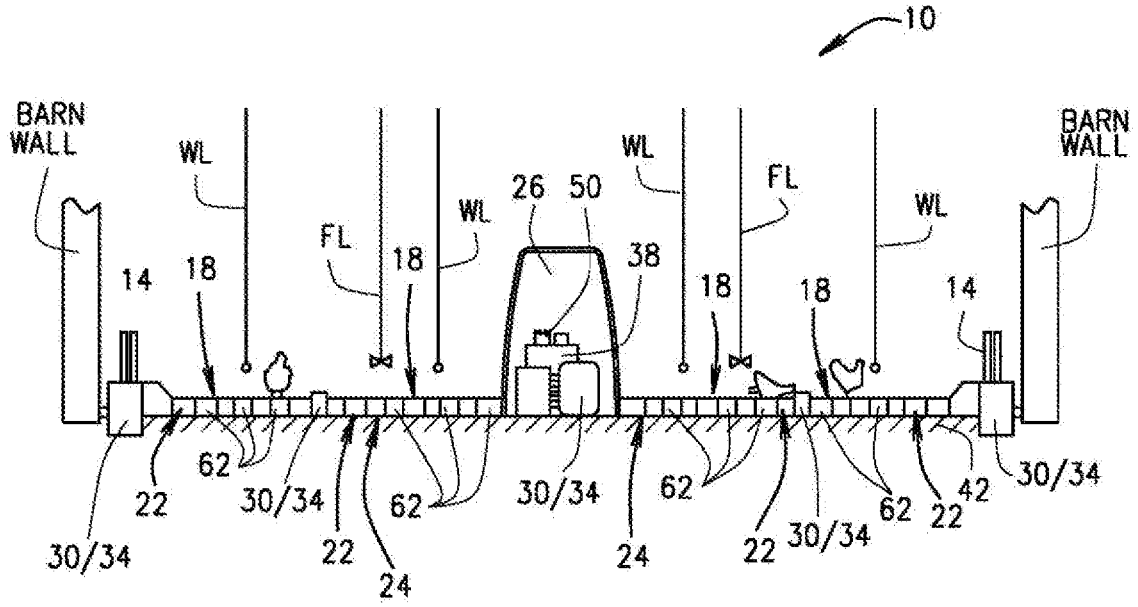
FIG. 5 is a front view of the robot shown in FIG. 1, illustrating another alternative layout of the wheels and equipment cabinet, in accordance with various embodiments of the present disclosure.

Referring now to FIG. 5, as described above, in various embodiments, the robot 10 can have width that is approximately equal to the width of the respective bedded floor of the barn in which the robot 10 is to be utilized. For example, as exemplarily illustrated in FIG. 5, in various embodiments the robot 10 can comprise a single equipment cabinet 26 with two collection platforms 18 and two conveyors 22 disposed on opposing sides of the equipment cabinet 26, wherein the width of the collection platforms 18 and the conveyors 22 is such that the overall width of the robot 10 is approximately equal to the width of the respective bedded floor of the barn in which the robot 10 is to be utilized. In such embodiments, the robot 10 can comprise one or two sets of sifting tines 90 extending from the conveyors 22, and/or one or two bedding tillers 94 and/or smoothing harrows 98 disposed on the rear of the robot 10.

Figure 6:
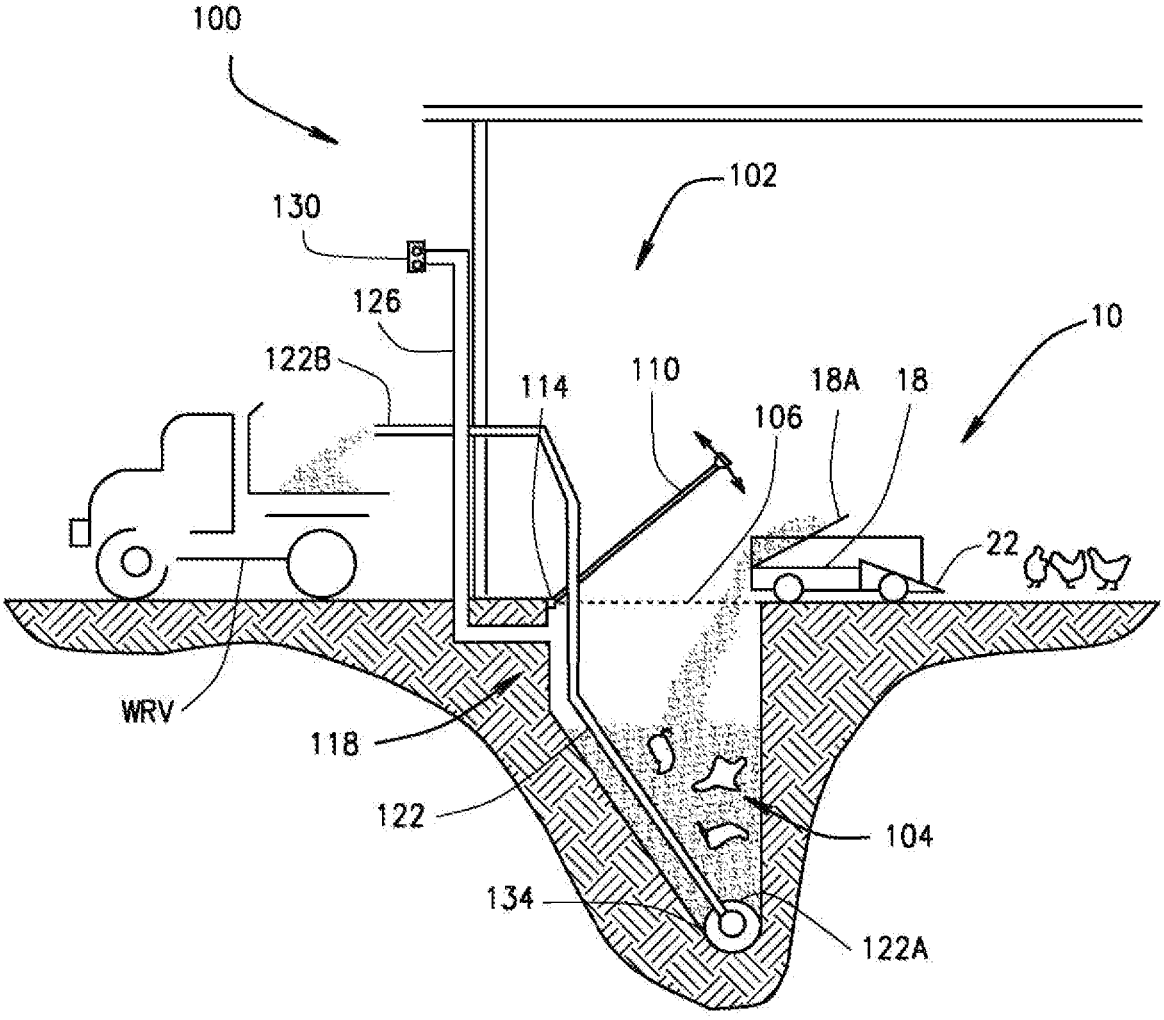
FIG. 6 is a poultry barn robotic operation system comprising the robot shown in FIG. 1 and bird and/or manure disposal pit, in accordance with various embodiments of the present disclosure.

Referring now to FIG. 6, in various embodiments, the present disclosure provides a poultry barn robotic operation system 100 that comprises the robot 10, as described herein, and a waste management system 102. The waste management system 102 generally comprises a bird and manure disposal pit 104 in which the dead birds and/or manure cakes collected by the robot 10, as described above, can be disposed. The disposal pit 104 can be located within the interior of the barn or outside the exterior of the barn. The disposal pit 104 illustrated in FIG. 6 is exemplarily illustrated within the interior of the barn. As described above, in various embodiments, the robot 10 includes the lift mechanism 54 structured and operable to controllably raise a leading edge 18A of the collection platform 18 to thereby controllably move the collection platform 18 between a Collection position (illustrated by the solid line in FIG. 2) and a Disposal position (illustrated by the dashed line in FIG. 2). In such embodiments, after (or any time during) the robot 10 has systematically traversed the bedded floor 42, the robot 10 can back up (as controlled by the controller(s) 46) to the disposal pit 104, whereafter the lift mechanism 54 (as controlled by the controller(s) 46) can raise the leading edge 18A of the collection platform 18. The lifting of the collection platform leading edge 18A allows the dead bird(s) and/or manure cake(s) collected by the robot 10 to slide off the collection platform 18, via the force of gravity, into the disposal pit 104.

In various embodiments, the waste management system 102 can comprise a stepping grate 106 (e.g., a metal lattice/grid structure) and a motorized solid cover plate 110. The stepping grate 106 is a lattice or grid structure that covers the top opening of the disposal pit 104 and comprises openings or apertures large enough to allow the dead birds and/or manure cakes to fall into the disposal pit 104. The cover plate 110 is a solid structure sized to cover the stepping grate 106 and substantially seal the top opening of the disposal pit 104. The motorized cover plate 110 is connected to a lift motor 114 that is structured and operable to raise and lower the cover plate 110 between a Closed position wherein the stepping grate 106 and top opening of the disposal pit 104 are covered, and an Opened position wherein the stepping grate 106 is exposed. The lift motor 110 is structured to include a controller (not shown) that is communicatively connected (wired and/or wirelessly) to the robot controller(s) 46. Accordingly, in such embodiments, after the robot 10 collects the dead birds and/or manure cakes, as described above, the robot 10 can back up (as controlled by the controller(s) 46) to the disposal pit 104. Subsequently, the controller(s) 46 can command the lift motor 114 to raise the cover plate 110 to the Opened position, and the lift mechanism 54 to raise the leading edge 18A of the collection platform 18, whereby the dead bird(s) and/or manure cake(s) collected by the robot 10 slide off the collection platform 18, via the force of gravity, into the disposal pit 104.

In various embodiments, the waste management system 102 can further comprise a waste removal system 118 that is structured and operable to automatically remove the dead birds (more particularly the remains of the dead birds) and/or manure cakes from the disposal pit 104. In various instances, the waste removal system 118 can comprises a waste conveyance pipe 122, a vent pipe 126, a vent fan 130, a waste conveyor mechanism (e.g., a helical screw elevator or lift) (not shown) disposed within the conveyance pipe 122, and a waste grinder 134. Vent pipe 126 extends between the disposal pit 104 and an exterior of the barn, and is structured and operable to vent air and waste gases from the disposal pit 104 utilizing the vent fan 130. Moreover, the vent fan 130 creates a negative pressure within the disposal pit 104 such that unpleasant and/or harmful gases produced by the dead birds are vented to the exterior of the barn and prevented from entering the interior environment of the barn.

The waste grinder 134 (e.g., a worm gear type grinder) is disposed substantially at the bottom of the disposal pit 104 and is structured and operable to remove the remains of the dead birds and/or manure cakes such that the resulting waste product can be transported through the waste conveyance pipe 122, via, the waste conveyor mechanism, to a waste removal vehicle WRV parked outside the barn adjacent an egress end 1228 of the waste conveyance pipe 122. In various embodiments the waste grinder 134 can grind up the dead birds and/or manure cakes for removal via the waste conveyance pipe 122. The waste conveyance pipe 122 extends between waste grinder 134 and the exterior of the barn. Particularly, the conveyance pipe 122 comprises in intake end 122A that is in fluid connection with the waste grinder 134 and the egress end 122B that extends outside the barn such that the waste removal vehicle WRV can be positioned to collect waste matter expelled from the waste conveyance pipe 122. The waste conveyor mechanism disposed within the waste conveyance pipe 122 can be any mechanism structured and operable to convey the waste material output by the waste grinder 134 through the waste conveyance pipe 122 and expel the waste material out of the waste conveyance pipe egress end 122B. For example, in various embodiments, the waste conveyor mechanism can be a helical screw elevator or lift. Accordingly, to remove the dead birds and/or manure cakes from the disposal pit 104, the waste grinder 134 grinds or sufficiently dismembers the dead birds and/or manure waste and transports the resulting waste to the intake end 122A of the waste conveyance pipe 122. Thereafter, the waste conveyor mechanism conveys the resulting waste product through the waste conveyance pipe 122 where the waste material is expel into, and collect by, the waste removal vehicle.

In various embodiments, the poultry barn robotic operation system 100, can additionally include a quarantine zone near the disposal pit 104, where sick birds can be identified by humans and moved to the quarantine zone for further observation or medical treatment.

In various embodiments, the poultry barn robotic operation system 100 can further comprise the robot guidance system 136 (e.g., the guide tracks 138) described above.

Figure 7:
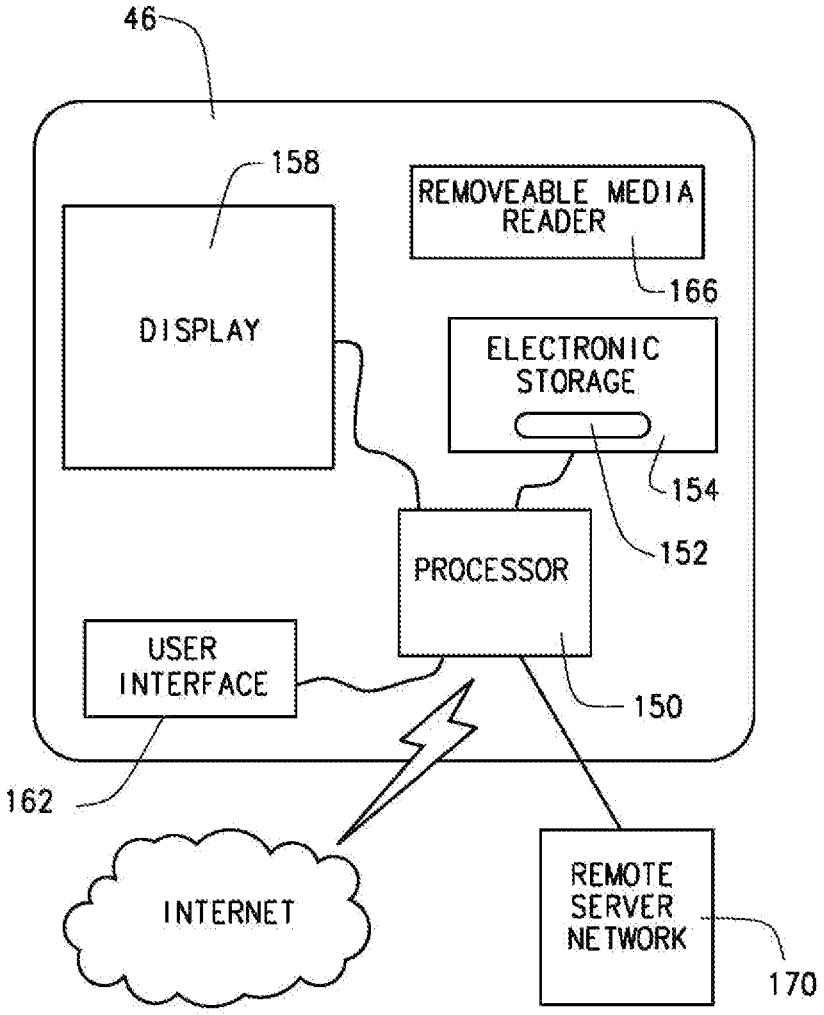
FIG. 7 is a block diagram of a controller system of the robot shown in FIG. 1, in accordance with various embodiments of the present disclosure.

Referring now to FIG. 7, as described above, the robot 10 and all its various systems, subsystems, components, mechanisms and apparatus described herein, and the poultry barn system 100 as described herein are controlled by the controller(s) 46, more particularly, by the execution of various robot collection, monitoring and/or control system software, programs, algorithms and/or codes (identified in FIG. 7 by reference number 152 to control the operation of the robot 10 executed by at least one processor 150 of the controller(s) 46. Although the controller(s) 46 is shown in the figures to be locally located on the robot 10, in various embodiments, the controller(s) 46 can include one or more remotely located computer, or computer based system, that bidirectionally communicates with the portion of the controller(s) 46 located locally on the robot 10, to control the operation and movement of the robot 10, as described here. In various embodiments, the controller(s) 46 includes at least one electronic storage device 154 that comprises a computer readable medium, e.g., non-transitory, tangible, computer-readable medium, such as a hard drive, erasable programmable read-only memory (EPROM), electronically erasable programmable read-only memory (EEPROM), read-write memory (RWM), etc. Other, non-limiting examples of the non-transitory, tangible, computer-readable medium are nonvolatile memory, magnetic storage, and optical storage. Generally, the electronic storage device 154 can comprise any computer readable medium capable of storing such things as the various software, programs, algorithms, code 152, digital information, data, look-up tables, spreadsheets and/or databases, etc., used and executed during operation of the robot 10 and all its various systems, subsystems, components, mechanisms and apparatus, and the poultry barn system 100, as described herein.

Furthermore, in various implementations, the controller(s) 46 can include at least one display 158 for displaying such things as information, data and/or graphical representations. In various embodiments, the display 158 can be disposed on the exterior of the equipment cabinet(s) 26. In various embodiments, the controller additionally can comprise at least one user interface device 162, such as a keyboard, mouse, stylus, and/or an interactive touch-screen on the display 158. Furthermore, in various embodiments, the controller(s) 46 can include a removable media reader 166 for reading information and data from and/or writing information and data to removable electronic storage media such as zip disks, flash drives, the Cloud or other online storage methods, or any other computer readable removable and portable electronic storage media. In various embodiments the removable media reader 166 can be an I/O port of the respective utilized to read external or peripheral memory devices such as flash drives or external hard drives. Furthermore, in various embodiments, the controller(s) 46 can be communicatively connectable to a remote server network 170, e.g., a local area network (LAN), via a wired or wireless link. Accordingly, the controller(s) 46 can communicate with the remote server network 170 to upload and/or download data, information, algorithms, software programs, and/or receive operational commands. Additionally, in various embodiments, the controller(s) 46 can be structured and operable to access the Internet to upload and/or download data, information, algorithms, software programs, etc., to and from Internet sites and network servers. Additionally, as described above, in various embodiments, the controller(s) 46 can execute artificial intelligence (AI) software, and/or communicate with a remotely located portion of the controller(s) 46 that executes AI software, to control the operation of the robot 10 and the poultry and environmental health diagnosis and treatment.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A poultry growing robot for robotically preforming various poultry growing operation tasks, said robot comprising:

a chassis;

a collection platform pivotally mounted to the chassis, the collection platform structured and operable to collect dead birds and manure cakes and to have live birds stand thereon;

a conveyor connected to the chassis such that an elongated trailing edge thereof is positioned adjacent to an elongated leading [edged] *edge* of the collection platform, the conveyor comprising a conveyor system structured and operable to convey the dead birds and manure cakes from a bedded floor of a poultry growing barn to the collection platform;

at least one equipment cabinet mounted to the chassis; and at least one controller structured and operable to control:

movement of the robot through the poultry growing barn;

movement of the conveyor system; and movement of the collection platform between a Collection position and a Disposal position.

2. The robot of claim 1 further comprising a plurality of sifting teeth disposed on a leading edge of the conveyor structured and operable to sift through bedding material disposed on a floor of the barn to scoop up and guide the dead birds and manure cakes onto the conveyor as the robot moves through the barn.

3. The robot of claim 1 further comprising a bedding tiller structured and operable to at least one of till, turn, and aerate bedding material disposed on a floor of the barn as the robot moves through the barn.

4. The robot of claim 1 further comprising a smoothing harrow structured and operable to groom and substantially level bedding material disposed on a floor of the barn as the robot moves through the barn.

5. The robot of claim 1 further comprising at least one of:

a plurality of sifting teeth disposed on a leading edge of the conveyor structured and operable to sift through bedding material disposed on a floor of the barn to scoop up and guide the dead birds and manure cakes onto the conveyor as the robot moves through the barn;

a bedding tiller structured and operable to at least one of till, turn, and aerate bedding material disposed on a floor of the barn as the robot moves through the barn; and a smoothing harrow structured and operable to groom and substantially level bedding material disposed on a floor of the barn as the robot moves through the barn.

6. The robot of claim 1 further comprising a lift mechanism connected to the collection platform and structured and operable to selectively move the collection platform between the Collection position and the Disposal position.

7. The robot of claim 1 further comprising at least one of:

at least one poultry health sensor;

at least one barn environmental condition sensor;

at least one data collection device; and at least one imaging devices.

8. The robot of claim 1, wherein a height of the at least one equipment cabinet is higher than a height of the collection platform such that the robot can traverse a floor of a poultry barn without contacting water lines and feed lines of the barn.

9. The robot of claim 1, wherein the conveyor system comprises an eccentrically reciprocating table and grid system.

10. A method for preforming various poultry growing operation tasks, said method comprising:

robotically controlling the operation and movement of a robot such that the robot traverses a bedded floor of a poultry growing barn, utilizing at least one controller of the robot disposed within at least one equipment cabinet of the robot;

removing dead birds and manure cakes disposed on the bedded floor from the bedded floor utilizing a conveyor of the robot that is connected to a chassis of the robot such that an elongated trailing [edged] *edge* thereof is positioned adjacent to an elongated leading [edged] *edge* of a collection platform;

conveying the dead birds and manure cakes removed from the bedded floor to the collection platform of the robot utilizing conveyor system of the conveyor, wherein the collection platform is pivotally mounted to the chassis the collection platform and is structured and operable to collect dead birds and manure cakes and to have live birds stand thereon, wherein movement of the conveyor system is controlled by the at least one controller; and removing the dead birds and manure cakes from the collection platform by moving the collection platform between a Collection position and a Disposal position, wherein the movement of the collection platform is controlled by the at least one controller.

11. The method of claim 10 further comprising sifting through bedding material disposed on a floor of the barn to scoop up and guide the dead birds and manure cakes onto the conveyor as the robot moves through the barn utilizing a plurality of sifting teeth disposed on a leading edge of the conveyor.

12. The method of claim 10 further comprising at least one of tilling, turning, and aerating bedding material disposed on a floor of the barn as the robot moves through the barn utilizing a bedding tiller of the robot.

13. The method of claim 10 further comprising at least one of grooming and substantially leveling bedding material disposed on a floor of the barn as the robot moves through the barn utilizing a smoothing harrow of the robot.

14. The method of claim 10 further comprising at least one of:

sifting through bedding material disposed on a floor of the barn to scoop up and guide the dead birds and manure cakes onto the conveyor as the robot moves through the barn utilizing a plurality of sifting teeth disposed on a leading edge of the conveyor, at least one of tilling, turning, and aerating bedding material disposed on a floor of the barn as the robot moves through the barn utilizing a bedding tiller of the robot; and at least one of grooming and substantially leveling bedding material disposed on a floor of the barn as the robot moves through the barn utilizing a smoothing harrow of the robot.

15. The method of claim 10 further comprising selectively moving the collection platform between the Collection position and the Disposal position utilizing a lift mechanism connected to the collection platform of the robot.

16. The method of claim 10, wherein robotically controlling the operation and movement of the robot comprises controlling the operation and movement of the robot via artificial intelligence executed by the at least one controller.

17. A poultry growing robotic operation system, said system comprising:

a poultry growing robot for robotically preforming various poultry growing operation tasks, the robot comprising:

a chassis;

a collection platform pivotally mounted to the chassis, the collection platform structured and operable to collect dead birds and manure cakes and to have live birds stand thereon;

an conveyor connected to the chassis such that an elongated trailing [edged] edge thereof is positioned adjacent to an elongated leading [edged] *edge* of the collection platform, the conveyor comprising a conveyor system structured and operable to convey the dead birds and manure cakes from a bedded floor of a poultry growing barn to the collection platform;

at least one equipment cabinet mounted to the chassis; and at least one controller structured and operable to control:

movement of the robot through the poultry growing barn;

movement of the conveyor system; and movement of the collection platform between a Collection position and a Disposal position; and a waste management system, the waste management system comprising:

a bird and manure disposal pit structured and operable to receive the dead birds and manure cakes collected and disposed into the bird and manure disposal pit via the robot; and a waste removal system structured and operable to remove the dead birds and manure cakes disposed into the bird and manure disposal pit.

18. The system of claim 17, wherein the robot further comprises at least one of:

a plurality of sifting teeth disposed on a leading edge of the conveyor structured and operable to sift through bedding material disposed on a floor of the barn to scoop up and guide the dead birds and manure cakes onto the conveyor as the robot moves through the barn;

a bedding tiller structured and operable to at least one of till, turn, and aerate bedding material disposed on a floor of the barn as the robot moves through the barn; and a smoothing harrow structured and operable to groom and substantially level bedding material disposed on a floor of the barn as the robot moves through the barn.

19. The system of claim 17, wherein the robot further comprises a lift mechanism connected to the collection platform and structured and operable to selectively move the collection platform between the Collection position and the Disposal position.

20. The system of claim 17, where the robot further comprises at least one of:

at least one poultry health sensor;

at least one barn environmental condition sensor;

at least one data collection device; and at least one imaging devices.

21. The system of claim 17, wherein the waste removal system comprises;

a waste grinder disposed substantially at a bottom of the bird and manure disposal pit, and structured and operable to remove the dead birds and manure cakes disposed in the bird and manure disposal pit via the robot to produce waste product; and a waste conveyance pipe having a waste conveyor mechanism disposed therewithin, waste conveyance pipe and waste conveyor mechanism structured and operable to transport the waste product from the bird and manure disposal pit to a waste removal vehicle.

22. The system of claim 17, wherein the waste management system further comprises:

a stepping grate disposed over a top opening of the bird and manure disposal pit; and a motorized cover plate structured and operable to controllably move between a Closed position wherein the cover plate covers the stepping grate and the top opening of the bird and manure disposal pit, and an Open position wherein the stepping grate and the top opening of the bird and manure disposal pit are exposed such that the robot can dispose the collected dead birds and manure cakes therein.

23. The system of claim 17 further comprising a robot guidance system disposed on a floor of the barn.

* * * * *